Oct. 4, 1938. L. FOCHT Re. 20,872

FLOOR SUPPORTING STRUCTURE

Original Filed May 10, 1933

INVENTOR
LOUIS FOCHT.
BY A. Parker Smith
ATTORNEY

UNITED STATES PATENT OFFICE 20,872

FLOOR SUPPORTING STRUCTURE

Louis Focht, Trenton, N. J.

Original No. 2,120,802, dated June 14, 1938, Serial No. 670,292, May 10, 1933. Application for reissue August 10, 1938, Serial No. 224,225

7 Claims. (Cl. 189—34)

This invention relates to flooring structures generally, but is more specifically designed to produce a light but strong assembly of standard commercial channel, angle and/or T-irons, on which any desired character of pavement can be laid to form a bridge floor or deck.

To this end the invention consists essentially in an assembly of a plurality of relatively wide, and relatively shallow, channel members placed side by side to form the main portion of the deck structure, with angle irons or T-irons or flat portions of other members of standard cross sections fastened between the adjacent flanges of such channel members, such deck assembly resting upon the usual skeleton supporting construction comprising stringers, and/or sills, etc., and forming an imperforate foundation on which any desired paving may be placed.

The channel irons are arranged with their channels underneath so that their webs lie in the same upper plane, thus forming a cellular deck structure with a substantially smooth upper surface on which paving blocks may be laid directly after the application to said surface, if desired, of the usual waterproof coating with or without an added layer of cushioning material.

Figure 1:
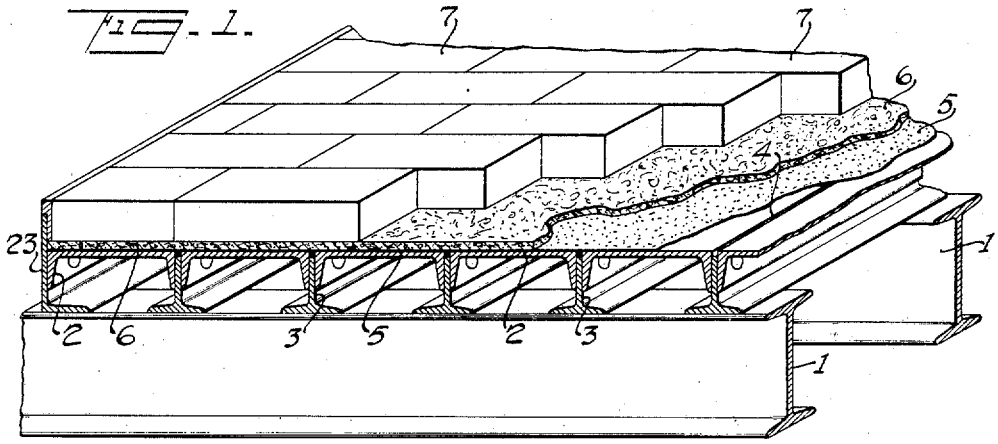

The best form of apparatus at present known to me embodying my invention, with sundry modifications thereof, are illustrated in the accompanying sheet of drawings, in which Fig. 1 is a perspective view with parts broken away and others shown in section showing a portion of a bridge floor constructed in accordance with my invention.

Figure 3:
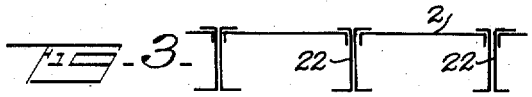
Figure 2:
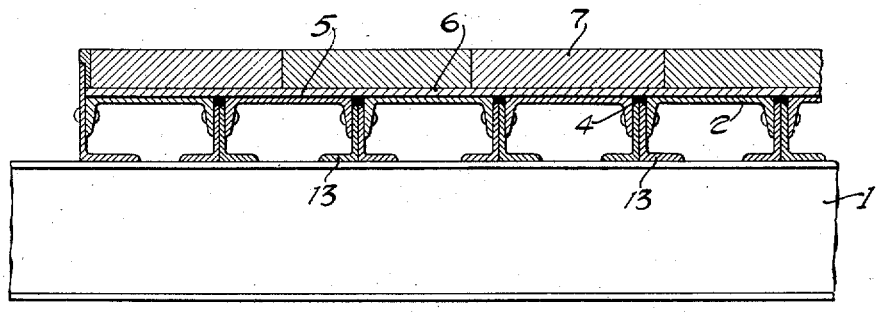

Fig. 2 is a similar sectional view showing a modification in which angle irons are used, and Fig. 3 is a similar diagram of another modification in which nothing but channel members are used in forming the steel structure.

Throughout the drawing like reference characters indicate like parts.

1,1, indicate the bridge stringers or other portions of the bridge floor supporting structure on which the deck structure of my invention is directly supported. 2,2, are channel members or channel irons or similar channel members of any standard rolled type and cross section arranged with their flanges adjacent one to another, and all their channels on the under surfaces; so that the exterior surfaces of their webs are all in substantially one and the same plane forming the major portion of the upper surface of the structure so assembled. 3,3, are T-irons the webs of which are inserted between the adjacent flanges of the channel members 2, 2, and are fastened thereto by riveting, welding or in any other desired manner. The T-irons are so arranged that their flanges project beyond and extend across below the free edges of the channel member flanges. The webs of the T-irons are preferably so located that shallow grooves 4 are left between adjacent channel beams and into which the film of waterproofing material 5 and originally plastic cushioning material 6 may flow so as to key the said mass of these materials to the floor formed by the channel members, though this is not always necessary with road surfacings of some types, nor when the upper surfaces of the channel webs are left exposed and themselves form the floor surface in a warehouse or other building. 23 is an angle iron having an elongated web which is substituted for a T-iron at the edge of the floor and extends far enough up to form a retaining flange for the pavement blocks 7, 7, which may be of any desired character.

The foregoing described construction is evidently light in weight, being of the cellular type, but furnishes a secure, even surfaced and rigid base on which any desired form of paving may be laid.

In Fig. 2, T-irons 3, 3, are replaced by pairs of angle irons 13, 13, placed back to back. This construction is a little heavier than that shown in Fig. 1, but has a corresponding increase of strength. 23 is the same edge forming element as is shown in Figure 1, and is similarly fastened to the outermost channel member flange.

If still greater strength in the vertically arranged elements of the construction is desired other channel members 22, 22, may be substituted for the T-irons, or angle irons, as shown in Fig. 3, the upper flange of each of the vertically arranged channel members resting on the upper surfaces of the webs of the adjacent, horizontally disposed, channel members, and serving as keying members acting to prevent the cushioning layer, or other plastic covering, from slipping laterally.

Among the advantages of the invention may be mentioned the following: A saving of about 50% in weight over most standard types of flooring of the same strength, this permitting a saving of about 17% in the total cost of a bridge designed to carry a given live load by reason of the saving of the weight of material in the main bridge supporting structure rendered possible by the consequent saving in dead load; or, conversely, a gain of 100% in strength of flooring of the weight now employed in standard bridge designs; ease and elasticity of fabrication resulting from the use of only the various commercial, standard elements of steel construction which may be bought in open market of any desired weight and strength and in any quantity from stock, and which can be readily riveted or welded together in the shop or on the job.

The cross sections of the commercial channel members shown in the drawing also have an advantageous feature in that the flanges of said channels all have cross sections flaring upwardly when the floor is in position for use. Any two of these flanges having the intervening web of an inverted T-iron securely fastened thereto, as by riveting or welding, together with the immediately adjacent portions of channel webs, form a built-up I-beam. This is the strongest form of rolled steel shapes for service as a beam carrying a concentrated load between spaced-apart supports, and that is the work a bridge floor must do when a heavily loaded truck wheel rolls on it.

Furthermore, each such flange of upwardly and outwardly flaring cross section forms, with the adjacent portion of the channel web, a cantilever supported from the T-iron web to which it is riveted, and thereby gives additional stiffness under loads to the medial portion of such channel web forming with it a part of the upper portion of the floor structure.

Thus while channel members having other cross sections varying in details of outline from those here shown can be used in various different embodiments of my invention, I believe that floors built as shown in Fig. 1 develop per unit of weight the greater resistance to flexure under concentrated loads.

As both channel members and T-irons can be rolled to exact length, up to the width of the roadways of the largest bridges, there is no cutting of the material required after delivery to the user, and no wastage thereof occurs. Also, the great strength and stiffness of the floor structure allows the stringers, or other members of the main bridge structure supporting it, to be placed farther apart than has heretofore been necessary with floors of the prior art. Consequently, a lesser number of such stringers are needed to a given width of roadway.

All types shown afford ready access to all the exposed metal surfaces for painting and repainting and the possibility of running trucks over the steel floor formed by the metal members alone when delivering and applying the cushioning layer and paving blocks, and that of being able to put the completed flooring into regular use without any addition of the superposed paving blocks or other surfacing materials, constitute practical points of advantage. The types shown in all said figures of the drawing also permit the easy removal and replacement of small areas of the block paving, when necessary, without sacrificing the original smoothness of the paving surface which is automatically retained by the permanently level surface of the underlying metal structure. Furthermore, in case of the wrecking of the bridge the deck can be removed in sections and used elsewhere.

All the types shown also serve for efficient lateral bracing of the deck and thereby supplement the action of the lower, lateral bracing, or render possible the saving of material in such lower bracing structure while preserving the total horizontal bracing effect now given by other existing constructions of substantially the same weight.

In addition to highway bridges, this type of floor can also be advantageously used in warehouses, docks, railroad bridges, and other structures subjected to heavy loads. In the case of railroad bridges the paving blocks and some or all of the surfacing layers shown in the drawing may be dispensed with and the track rails fastened to the channel members, if desired, or otherwise supported therefrom.

Various changes in details of construction and assembly, other than those specifically illustrated and described herein, can be made without departing from the underlying principle of the invention as above explained and hereinafter defined in the appended claims, and without materially sacrificing the main advantages above enumerated, and others obvious to those skilled in the art.

In all such modifications the prime advantage of having the upper, exterior surfaces of the webs of the channel members lying in substantially one and the same plane should be retained to form a rigid, substantially continuous floor, or similar supporting surface for any additional road surfacing material if the latter is employed.

Having described my invention, I claim:

1. As a new article of manufacture, a floor structure for bridges and like purposes comprising a plurality of standard rolled channel members arranged with the exterior surfaces of their flanges closely adjacent one to another and the exterior surfaces of their webs all in substantially one and the same plane forming the upper surface of the structure so assembled, said channel members being combined with a plurality of straight metal members each one of which is confined between two adjacent flanges of said channel members but projects beyond the free edges of said flanges, together with means for rigidly fastening together said flanges and intervening strips in relative positions such that the upper edge of each strip shall be slightly below the plane of the upper surfaces of the webs of said channel members, thereby forming a plurality of slots in the upper surface of the structure into which any plastic composition applied to such upper surface may penetrate to form keying means thereto.

2. A structure such as defined in claim 1, combined with a continuous layer of originally plastic material applied to said surfaces and extending into the grooves so left between adjacent members.

3. A combination such as defined in claim 1 in which said intervening members comprise the webs of a plurality of T-irons, the flanges of which extend across the free edges of said channel member flanges.

4. In a floor structure for bridges and like purposes, a plurality of standard rolled channel members arranged with the exterior surfaces of their flanges closely adjacent one to another, and the exterior surfaces of their webs all in substantially one and the same plane forming the upper surface of the structure so assembled, combined with a plurality of T-irons each one of which has its upwardly projecting web confined between two adjacent flanges of said channel members and its flanges extending below the free edges thereof, together with means for fastening together said flanges and T-iron webs; whereby said T-iron flanges serve both as supports for the floor structure so formed and as tension members to assist in resisting any disruptive strains to which the lower edges of said channel member flanges may be subjected as the result of deflection thereof caused by loads applied between spaced apart supports for said floor structure.

5. A structure such as defined in claim 4 combined with spaced apart supports extending under said T-irons and substantially at right angles thereto.

6. As a new article of manufacture, a floor structure for bridges and like purposes comprising a plurality of standard rolled channel members arranged with the exterior surfaces of their flanges closely adjacent one to another and the exterior surfaces of their webs all in substantially one and the same plane, said members being combined with a plurality of supporting members each having a flat section confined between two adjacent flanges of said first-mentioned channel members and fastened thereto in positions such that their upper portions cooperate with the upper surfaces of said channel members to form keying means for preventing lateral displacement of any layer of plastic composition which may be applied to such upper surface, while their lower portions project below the flanges of said channel members and thus serve as supports for the assembled structure and for resisting tension stresses developing in said structure when in use as a floor.

7. A structure such as defined in claim 4 in which the flanges of said channels have cross sections flaring upwardly when the floor is in position for use, whereby they then cooperate with the T-irons, on either side of the webs of which T-irons they are fastened, to form built-up I-beams incorporated in such finished floor.

LOUIS FOCHT.